Sept. 11, 1928.　　　　　E. F. MAAS　　　　　1,683,787
MACHINE FOR UNWRAPPING TUBES
Filed March 16, 1926　　　2 Sheets-Sheet 1
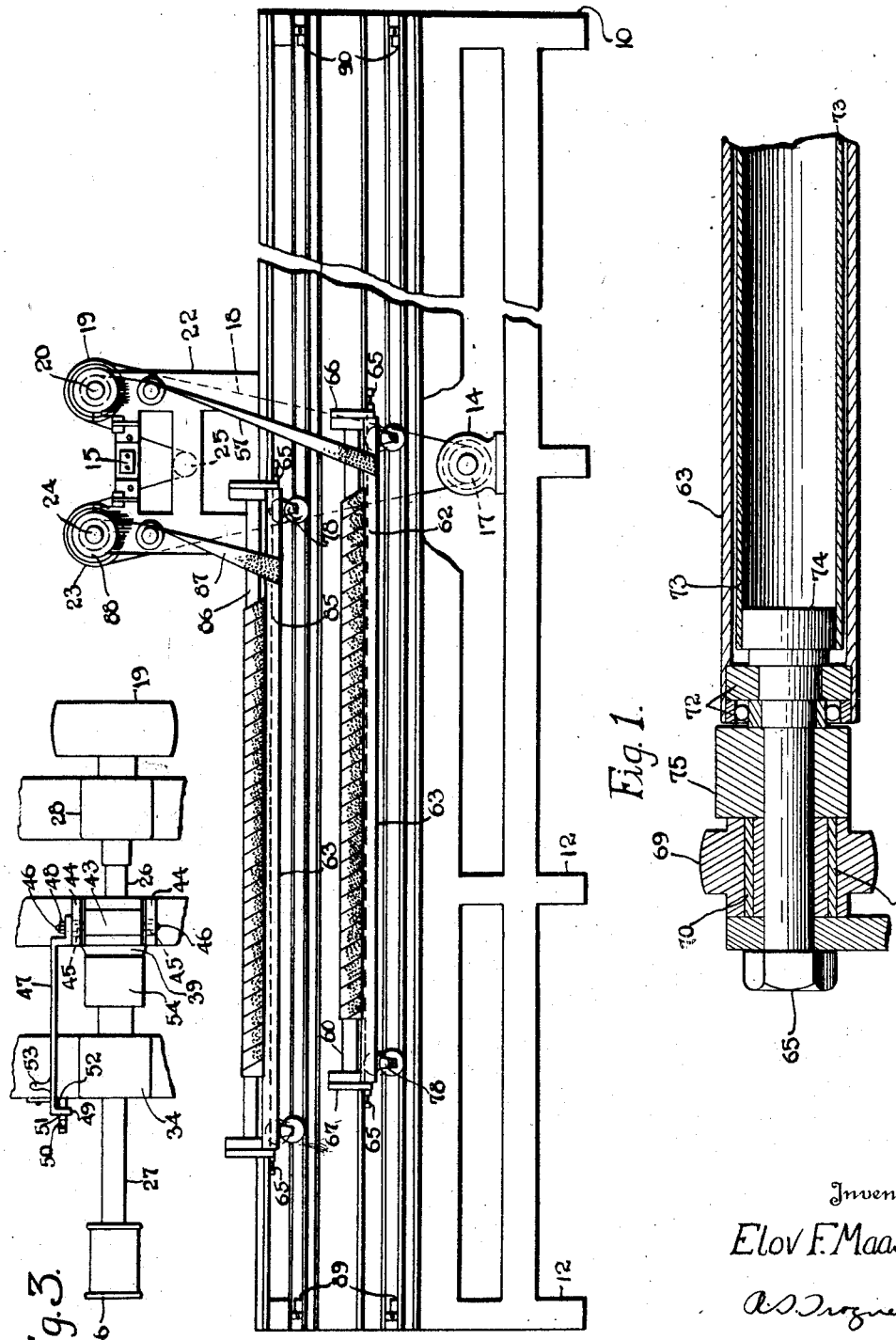
Inventor
Elov F. Maas.
Attorney Sept. 11, 1928.                                                   1,683,787
                        E. F. MAAS
               MACHINE FOR UNWRAPPING TUBES
               Filed March 16, 1926      2 Sheets-Sheet 2
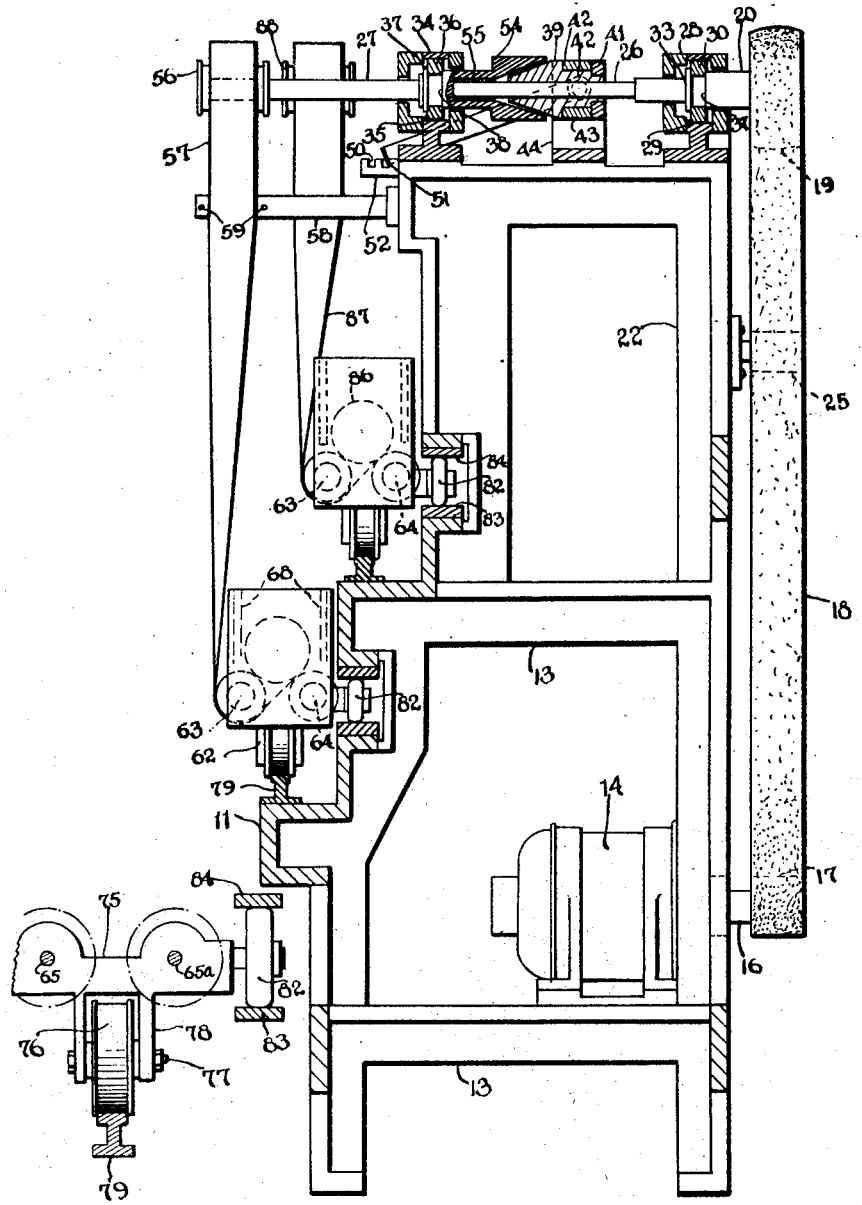
Inventor
Elov. F. Maas.
By
Attorney Patented Sept. 11, 1928.

1,683,787

UNITED STATES PATENT OFFICE.

ELOV F. MAAS, OF AKRON, OHIO, ASSIGNOR TO THE GOODYEAR TIRE & RUBBER COMPANY, OF AKRON, OHIO, A CORPORATION OF OHIO.

MACHINE FOR UNWRAPPING TUBES.

Application filed March 16, 1926. Serial No. 95,044.

My invention relates to machines employed in connection with the manufacture of inner tubes, and it has particular relation to a machine which is adapted to remove flexible wrappings from inner tubes after the latter have been vulcanized.

The object of my invention is to provide a machine which will unwrap spirally wound material from a tubular member and simultaneously wrap the material upon a spool or reel, the only manual operations necessary being those of connecting the wrapping to a spool and energizing a motor for driving the elements of the machine.

In the manufacture of inner tubes used in tire casings, a strip or sheet of uncured rubber is wrapped about a tubular pole or core to form a tube. In order to hold the rubber in proper position on the pole and under compression, a relatively long fabric strip is wound spirally upon the uncured rubber, and the pole with the wrapped tube thereon is then placed in a suitable heater to vulcanize the rubber. Soapstone or similar material is applied to the fabric strip to prevent it from adhering to the rubber, and to facilitate the unwrapping operation.

Heretofore, in unwrapping tubes, it has been the customary practice to rotatably support wrapped tube-forming poles upon carriages, the latter being positioned adjacent an apparatus provided with a driven reel or spool. The operator then attached one end of the wrapping strip to the reel and manually guided the strip as it was wrapped thereon. At the same time, it was necessary for the operator to manually move the carriage along its track in order to maintain the strip in proper alignment with respect to the rotated reel. It is apparent that such operation involves considerable time and inconvenience to the operator, and accordingly is relatively expensive.

By my invention the operation of unwrapping tubes from a pole is materially simplified by providing a machine which includes a plurality of tube-supporting carriages adapted to move automatically as the wrapped strip is removed therefrom. Moreover, each fabric strip is mechanically guided while it is being removed from each carriage and wrapped on an independent spool or reel.

Another advantage of my invention resides in the fact that while one tube is being unwrapped, another may be placed on the machine and a second operation begun. As each reel and carriage is adapted to be operated independently, and as each operation requires relatively little time, one operator is enabled to unwrap approximately twice as many tubes as he was able to unwrap by the methods hitherto known.

For a better understanding of my invention, reference may now be had to the accompanying drawings forming a part of this specification, of which Fig. 1 is a fragmentary side elevational view of a machine constructed in accordance with my invention;

Fig. 2 is an end view, partially in elevation and partially in section, on an enlarged scale, showing a machine embodying my invention;

Fig. 3 is a fragmentary plan view of one of the unwrapping mechanisms embodying my invention;

Fig. 4 is a view on an enlarged scale illustrating the structure employed in mounting the carriages used in my invention; and Fig. 5 is a fragmentary longitudinal sectional view on an enlarged scale showing in detail one of the tubular elements forming a part of my machine.

In practicing my invention I provide a suitable supporting frame 10 having longitudinal and vertical reinforcing members 11 and 12, respectively, and cross members 13 serving the purpose of affording a rigid stable structure for supporting the operating mechanism included in my invention. One of the lower cross members 13 is adapted to serve as a support for an electric motor 14 controlled by a suitably mounted switch 15, and which is provided with a drive shaft 16 having a pulley 17 rigidly attached thereto. The pulley 17 is adapted to drive an endless belt 18 trained thereabout and extending upwardly over a pulley 19 which is secured to and drives a transversely extending shaft 20 mounted upon a support 22, constituting the upper portion of the machine frame. A second pulley 23 mounted upon a shaft 24, parallel to the shaft 20, is also driven by the belt 18. An idler pulley 25 is mounted upon the support 22 and by training the belt 18 thereabout a firm purchase is effected by the belt upon the pulleys 19 and 23.

As the two shafts 20—24, and the pulleys 19—23, are respectively constructed and mounted in the same manner, a detailed description of one assembly will be sufficient for a thorough understanding of their structure.

As best shown in Fig. 2, the shaft 20 is constructed in two sections 26 and 27, and is journaled adjacent the pulley 19 in a bearing support 28 which is provided with an inner groove 29 adapted to receive a bearing member 30 carried between abutments 32 and 33 of the shaft. At the opposite side of the frame a bearing support 34, similar to the support 28, is mounted and is provided with an inner groove 35 which is adapted to receive a bearing member 36 disposed between abutments 37 and 38 formed on the shaft.

Between the bearing supports 30 and 34, I provide a slidable cone clutch member 39 splined to the shaft section 26. One end of the cone clutch member is provided with a reduced neck portion 40 having a disk 41 threaded thereon. The reduced neck portion provides an annular shoulder 42 intermediately of the cone clutch member 39. In order to operate the cone clutch member I provide a relatively rotatable ring 43 mounted upon the neck portion 40, and held in proper position between the shoulder 42 and the disk 41.

As best shown in Fig. 3 the ring 43 is prevented from rotating with respect to the shaft section 26 by means of trunnion supports 44 which are provided with slots 45 adapted to receive trunnions 46 extending integrally from opposite sides of the ring 43. One of the trunnions 46 is adapted to pivotally support one end of an arm 47 secured thereto by means of a nut 48. The other end of the arm is formed with an offset finger 49 adapted to engage notches 50 and 51 provided adjacent the end of a bracket 52 secured to the frame. Adjacent one end of the arm 47 a handle 53 is attached which may be grasped by the operator of the machine to slide the clutch member 42 upon the shaft 26.

At the inner end of the shaft section 27 a clutch member 54 is rigidly mounted, which is engaged internally by the cone clutch member 39. The end of the shaft section 26 is disposed within a bearing 55 provided at one end of the clutch member 54. From this construction it will be apparent that the arm 47 is adapted to be manipulated to slide the clutch member 39 into engagement with the cooperating clutch member 54, and thereby impart a positive drive to the shaft section 27 from the shaft section 26.

The outer end of the shaft section 27 supports a detachable spool or reel 56 which is adapted to wind thereon a strip of fabric material 57 which is guided by means of a horizontal rod 58 secured to the frame member 22. If desirable, guide fingers 59 may be secured to the rods, and the fabric strip disposed therebetween.

The fabric strip 57 is wound upon the reel or spool 56 from a spirally wound tube-forming pole 60, which is adapted to be supported by a carriage 62. The carriage 62 includes in its construction a rotatable tubular member 63 and a reinforcing tubular member 64, the member 63 being secured at its ends by means of bolts 65 to upright plates 66 and 67. The reinforcing tubular member 64 is rigidly secured to the upright plates 66 and 67 by means of bolts 65ª. Each plate is formed with a pair of flanges 68 which serve as guides for the end of the tube pole 60. Each of the bolts 65 and 65ª are provided with a roller 69 (Fig. 5), the roller being of greater diameter than the diameter of the tubular members 63 and 64 respectively, and serves as a rotatable support for the ends of the pole 60. The bolts 65 are also provided with bushings 70 and bearing members 72, the latter of which rotatably support the tube 63. In order to stabilize the carriage and to prevent vibration of the tube 63 as it rotates, a smaller tube member 73 is disposed therein and secured at each end to an enlargement 74 formed on the end of the bolts 65.

Between the end of the tube 63 and the roller 69, I provide a support 75 through which the bolts 65 and 65ª extend and which supports a roller 76 secured at 77 between spaced lugs 78 integral with the support 75. The roller 76 is adapted to travel upon a rail 79 secured to the longitudinal bracing member 11. Also an extension 80 supports a roller 82 which travels between two rails 83 and 84 secured to the frame of the machine. It will be noted that the rail 84 is disposed above the roller 82 in order to prevent the carriage from being displaced vertically.

A second carriage 85 is constructed in the same manner as the one just described, and is adapted to support a tube pole 86 wrapped with a fabric strip 87. The fabric strip is disposed over a spool 88 on the end of the shaft 24, which shaft, as above indicated, is constructed to correspond to the shaft 20. It is to be understood that each of the tubular members 63 is constructed in the same manner, and is provided with rollers at both ends corresponding to the roller 69.

At each end of the frame, in line with the carriages, rubber buffers 89 and 90 are attached, which stop the carriages as they roll upon the rail 79 and prevent them from being damaged by striking the metal frame structure.

In the operation of my machine, the wrapped tube-forming pole 60 is placed upon the carriage 62 with its ends resting upon the roller 69. The end of the fabric strip 57 is then trained beneath the tubular member 63 in order that there will be a downward force exerted upon the pole 60 as it is being unwrapped. Then the end of the strip 57 is attached and wound with one or more convolutions about the spool 56. It will be understood that the motor 14 is adapted to run continuously, and that after the strip is attached to the spool 56, the operator manually pulls the handle 53 to snap the finger 49 into the notch 50, thereby engaging the clutch members 39 and 54. Immediately the spool begins to rotate and unwinds the fabric strip from the pole 60. As the strip tends to maintain a vertical position from the pole to the spool, the carriage 62 will travel along the tracks toward one end of the frame 10 and will strike the rubber buffer 90 immediately after the strip has been completely unwound from the pole. At the other end of the frame, the buffer 89 likewise stops the carriage when it is moved back to begin a second unwrapping operation. The operation of the carriage 85 and shaft 24 is identical with the operation just described, and, therefore, further description thereof is not deemed necessary.

From the foregoing description it will be apparent that my invention will enable tire manufacturers to materially increase the speed of unwrapping tube poles, and that one man is enabled to unwrap approximately twice as many tubes as was possible by the heretofore known methods.

Although I have illustrated but one form which my invention may assume and have described in detail but a single application thereof, it will be apparent to those skilled in the art that it is not so limited but that various minor modifications and changes may be made therein without departing from the spirit of my invention or from the scope of the appended claims.

What I claim is:

1. A machine for unwrapping tubes comprising means for movably supporting a wrapped tube and a rotatable winding reel for simultaneously and continuously moving and unwrapping the tube.

2. A machine for removing the wrapping from tubes comprising a frame, a carriage including two concentric tubular members, one of which is rotatable by the purchase of the unwinding wrapping, means for supporting a wrapped tube on the carriage and means for simultaneously moving the carriage and unwrapping the tube.

3. A machine for removing the wrapping from tubes comprising a frame, a carriage having rollers thereon mounted upon the frame, means for rotatably supporting a wrapped tube upon the carriage and a single means for simultaneously and continuously moving the carriage and unwrapping the tube.

4. A machine for removing the wrapping from tubes comprising a frame provided with a track member, a carriage having rollers journaled thereon mounted upon the track, tube supporting rollers at either end of the carriage, and a separately mounted roller extending throughout the length of the carriage adapted to cooperate with the wrapping as it unwinds from the tube.

5. A machine for unwrapping tubes comprising means for movably supporting a wrapped tube and a winding reel for the wrapping mounted for rotation between planes substantially including the reach of the wrapping that extends between the tube and the reel.

6. A machine for unwrapping tubes comprising means for movably supporting a wrapped tube and a winding reel for receiving the wrapping from the tube mounted for rotation with its middle plane substantially tangent to one side of the tube.

In witness whereof, I have hereunto signed my name.

ELOV F. MAAS.